(12) United States Patent
Terada (10) Patent No.: US 9,065,531 B2
(45) Date of Patent: Jun. 23, 2015

(54) SIGNAL TRANSMITTER-RECEIVER APPARATUS

(71) Applicant: Yazaki Corporation, Tokyo (JP)

(72) Inventor: Tomoyasu Terada, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/226,122

(22) Filed: Mar. 26, 2014

(65) Prior Publication Data

US 2014/0206302 A1 Jul. 24, 2014

Related U.S. Application Data

(63) Continuation of application No. PCT/JP2012/074666, filed on Sep. 26, 2012.

(30) Foreign Application Priority Data

Sep. 26, 2011 (JP) ................................. 2011-208657

(51) Int. Cl.
| | |
|---|---|
| *B60K 28/00* | (2006.01) |
| *H04B 7/24* | (2006.01) |
| *B60N 2/48* | (2006.01) |
| *B60N 2/07* | (2006.01) |
| *B60N 2/02* | (2006.01) |

(52) U.S. Cl.
CPC ................ *H04B 7/24* (2013.01); *B60N 2/4876* (2013.01); *B60N 2/071* (2013.01); *B60N 2/0715* (2013.01); *B60N 2002/0264* (2013.01)

(58) Field of Classification Search
CPC ................... B60N 2/02; B60N 2/4876; B60N 2002/0264; B60N 2205/50
USPC .................... 180/273, 326, 329; 280/226.1
See application file for complete search history.

(56) References Cited

U.S. PATENT DOCUMENTS 6,242,701 B1 * 6/2001 Breed et al. .................... 177/144
6,820,896 B1 * 11/2004 Norton ........................... 280/735

(Continued)

FOREIGN PATENT DOCUMENTS

| JP | 11-017358 A | 1/1999 |
|---|---|---|
| JP | 2004-034764 A | 2/2004 |
| JP | 2008-260452 A | 10/2008 |

OTHER PUBLICATIONS

International Search Report dated Oct. 30, 2012, issued for PCT/JP2012/074666.

*Primary Examiner* — Duc M Nguyen
(74) *Attorney, Agent, or Firm* — Locke Lord LLP (57) ABSTRACT

To provide a signal transmitter-receiver apparatus having simple structure and which can prevent receiving sensitivity reduction of wirelessly transmitted signal using an existing component. A signal transmitter-receiver apparatus includes a first electric wire having one end connected to an electronic device provided at a vehicle sliding seat, a second electric wire wired at a vehicle body side, a signal transmitter connected to another end of the first electric wire, a signal receiver connected to an end of the second electric wire for receiving signal wirelessly transmitted from the signal transmitter, and a protector. The signal transmitter and the signal receiver are disposed in the rail. The signal transmitter is fixed to an upper rail via the protector. The signal receiver is fixed to one end portion of the rail. The signal transmitter and the signal receiver are arranged opposed to each other in a straight line.

6 Claims, 7 Drawing Sheets

(56) References Cited

U.S. PATENT DOCUMENTS

| | | |
|---|---|---|
| 6,849,807 B2 * | 2/2005 | Casey et al. .................. 177/144 |
| 6,928,889 B2 * | 8/2005 | Kojima et al. ........... 73/862.451 |
| 2006/0004518 A1 * | 1/2006 | Sleboda et al. ............... 701/300 |
| 2006/0217864 A1 * | 9/2006 | Johnson et al. ................. 701/45 |
| 2008/0157940 A1 * | 7/2008 | Breed et al. ................ 340/425.5 |

\* cited by examiner

SIGNAL TRANSMITTER-RECEIVER APPARATUS

TECHNICAL FIELD

The present invention relates to a signal transmitter-receiver apparatus for connecting, by wireless communication, an electronic device provided at a vehicle sliding seat to an electronic device provided at a vehicle body side.

BACKGROUND ART

A vehicle sliding seat of an automobile and such is provided with an electronic device such as a seating sensor for detecting whether or not a passenger is seated. Furthermore, recently, for enhanced safety of a passenger in a backseat, there is proposed a system for detecting whether or not the passenger is seat-belted when seated in the backseat and giving a warning. Such electronic devices mounted to the sliding seat are connected to an electronic device of a control device provided at a vehicle body side via an electric wire or via a signal transmitter-receiver apparatus using wireless communication as shown in FIG. 7 (refer to Patent Literature 1).

Figure 7:
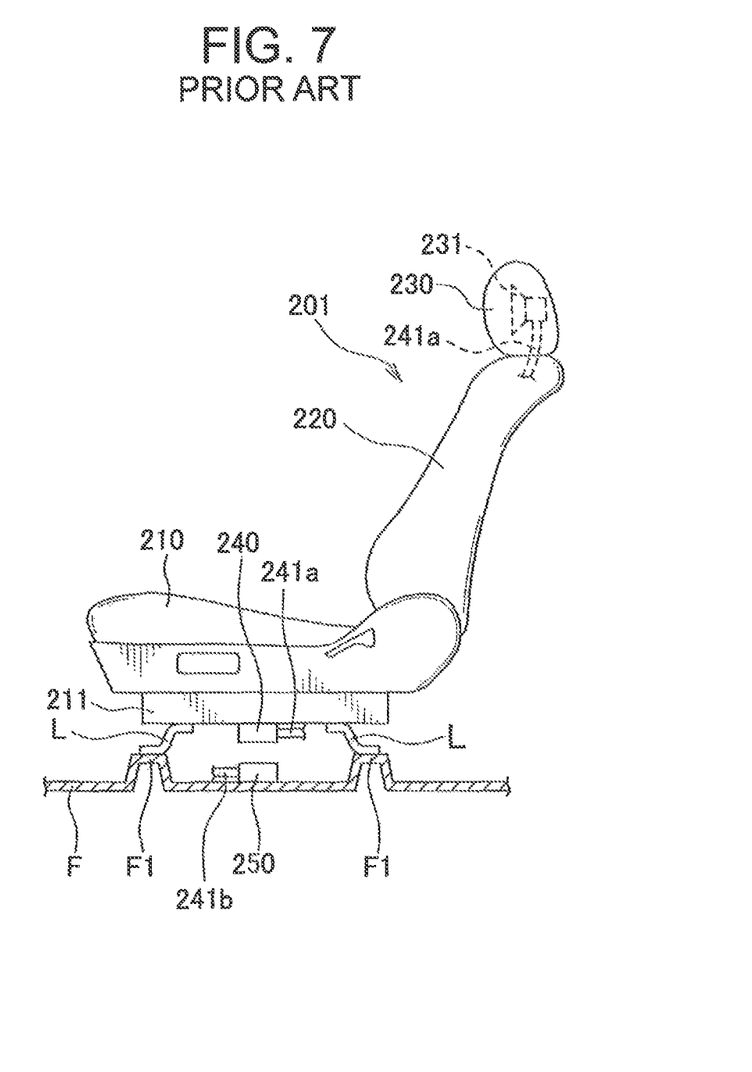
FIG. 7 is an illustration of a conventional signal transmitter-receiver apparatus.

The above-mentioned signal transmitter-receiver apparatus shown in FIG. 7 is explained below. The signal transmitter-receiver apparatus includes an infrared receiver 240, a seat signal wiring 241a, an infrared transmitter 250, and a vehicle body signal wiring 241b. Furthermore, in FIG. 7, a reference sign F denotes a vehicle body floor, and a reference sign 201 denotes a sliding seat.

The sliding seat 201 mainly includes a seat cushion 210, a seatback 220 and a head rest 230. This sliding seat 201 includes, at a lower face thereof, a left-right pair of sliding mechanisms having a lower rail 211 and an upper rail (not shown) arranged slidably movable with respect to the lower rail 211. The lower rail 211 is fixed to a mount portion F1 of the vehicle body floor F by a leg L. In this manner, the sliding seat 201 is arranged slidable in a front-back direction of the vehicle with respect to the vehicle body floor F. In addition, a speaker 231 as an electronic device is embedded in the head rest 230.

The infrared receiver 240 is attached to a lower face of the lower rail 211. The seat signal wiring 241a is wired inside of the sliding seat 201 and connecting the infrared receiver 240 to the speaker 231. The infrared transmitter 250 is attached at an upper face of the vehicle body floor F so as to be opposed to the infrared receiver 240 in a vertical direction. The vehicle body signal wiring 241b is wired at the vehicle body side and connecting the infrared transmitter 250 to a control device provided at the vehicle body side. Furthermore, the infrared transmitter 250 and the infrared receiver 240 are arranged in a non-contact fashion, and a signal is transmitted and received between the infrared transmitter 250 and the infrared receiver 240 via the infrared communication.

The above-mentioned control device and the speaker 231 are electrically-connected to each other by the connection of the above-mentioned signal transmitter-receiver apparatus. Thus, when the control device transmits an audio signal, for example, the speaker 231 emits sound via an amplifier disposed in the sliding seat 201.

CITATION LIST

Patent Literature

Patent Literature 1: Japan Patent Application Publication No. 2008-260452

SUMMARY OF INVENTION

Technical Problem

However, the signal transmitter-receiver apparatus shown in FIG. 7 has a problem that, the seat signal wiring 241a is required to include an extra length for a sliding distance of the sliding seat 201. Furthermore, there is also a problem that, it is necessary to provide an extra length absorbing structure for housing this extra length without tangle, causing the structure of the apparatus to be complex and the assembling operation to be complicated.

Moreover, the signal transmitter-receiver apparatus shown in FIG. 7 has a problem that, there is a risk that the receiving sensitivity is reduced when a foreign object enters between the infrared transmitter 250 and the infrared receiver 240. To solve this problem, in Patent Literature 1, there is provided a cover member covering a space below the seat so that the infrared transmitter 250 and the infrared receiver 240 are placed inside the cover member. However, preparation of such separate components will increase the cost and will make the assembling operation to be even more complicated.

Therefore, an object of the present invention is to provide a signal transmitter-receiver apparatus which has a simple structure and which can prevent, using an existing component, the reduction in the receiving sensitivity of a wirelessly transmitted signal.

Solution to Problem

To achieve the above-described object, a first aspect of the present invention provides a signal transmitter-receiver apparatus, including: a first electric wire having one end connected to an electronic device provided at a vehicle sliding seat; a second electric wire wired at a vehicle body side; a signal transmitter connected to another end of the first electric wire; a signal receiver connected to an end of the second electric wire and configured to receive a signal wirelessly transmitted from the signal transmitter; wherein the signal transmitter and the signal receiver are disposed in a rail disposed below the sliding seat, wherein the signal transmitter is fixed to an upper rail directly or via another member, the upper rail being attached to a lower face of the sliding seat and being slidably attached to the rail, wherein the signal receiver is fixed to one end portion of the rail, and wherein the signal transmitter and the signal receiver are arranged opposed to each other in a straight line.

A second aspect of the present invention provides the signal transmitter-receiver apparatus according to the first aspect, further including a protector made of synthetic resin, wherein the protector includes a tube portion through which the first electric wire is passed, a holding portion holding the signal transmitter, and a bracket configured to be attached to the upper rail.

A third aspect of the present invention provides, the signal transmitter-receiver apparatus according to the first or second aspect, further including a photovoltaic element connected to another end of the first electric wire, and a light emitting element connected to an end of the second electric wire and configured to radiate light to the photovoltaic element.

A forth aspect of the present invention provides, the signal transmitter-receiver apparatus according to the third aspect, wherein the signal transmitter is activated by a battery having charge function or by electromotive force of the photovoltaic element, and wherein the battery is charged by electromotive force of the Photovoltaic element.

Advantageous Effects of Invention

According to the first aspect of the present invention, the signal transmitter and the signal receiver are disposed in the rail disposed below the sliding seat, and the signal transmitter is fixed to the upper rail directly or via another member, the upper rail being attached to the lower face of the sliding seat and being slidably attached to the rail, and the signal receiver is fixed to one end portion of the rail, and the signal transmitter and the signal receiver are arranged opposed to each other in a straight line. Thus, there is no need to provide an extra length to the first electric wire for a sliding distance of the sliding seat, thereby simplifying the structure of the entire apparatus. Furthermore, the reduction in the receiving sensitivity of the wirelessly transmitted signal can be prevented using the rail which is an existing component.

According to the second aspect of the present invention, the apparatus further includes the protector made of synthetic resin, the protector including the tube portion through which the first electric wire is passed, the holding portion holding the signal transmitter, and the bracket configured to be attached to the upper rail. Thus, the signal transmitter can be easily fixed to the upper rail. Furthermore, the first electric wire can be prevented from being damaged by hitting against an edge of the rail.

According to the third aspect of the present invention, the apparatus further includes the photovoltaic element connected to the another end of the first electric wire, and the light emitting element connected to the end of the second electric wire and configured to radiate light to the photovoltaic element. Thus, the signal transmitter can be activated by the electromotive force of the photovoltaic element.

According to the fourth aspect of the present invention, the signal transmitter can be activated by the battery having charge function or by the electromotive force of the photovoltaic element. Furthermore, there is no need to replace the battery because the battery is charged by the electromotive force of the photovoltaic element.

DESCRIPTION OF EMBODIMENTS

First Embodiment

A signal transmitter-receiver apparatus according a first embodiment of the present invention will be explained with reference to FIGS. 1 through 4.

Figure 1:
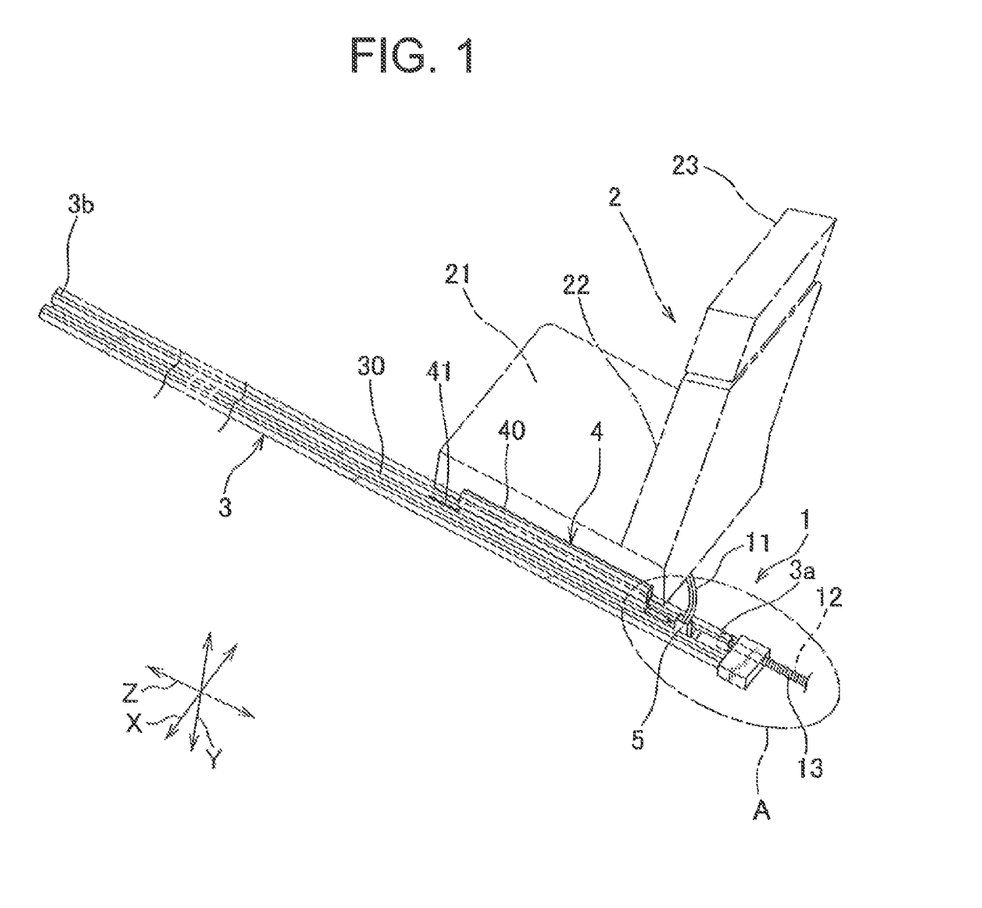
FIG. 1 is a perspective view of a signal transmitter-receiver apparatus according to a first embodiment of the present invention.

"Signal transmitter-receiver apparatus 1" according to the present invention shown in FIG. 1 is an apparatus configured to connect, using wireless communication, an electronic device provided at a vehicle sliding seat 2 to an electronic device provided at a vehicle body side. In this embodiment, "signal transmitter-receiver apparatus 1" is applied to an automobile. In the following, the vehicle sliding seat 2 is simply referred to as the sliding seat 2.

The signal transmitter-receiver apparatus 1 includes a first electric wire 11 having one end connected to the electronic device provided at the sliding seat 2, a second electric wire 12 wired at the vehicle body side, a signal transmitter 6 connected to another end of the first electric wire 11, a signal receiver 7 connected to an end of the second electric wire 12 and configured to receive a signal wirelessly transmitted from the signal transmitter 6, and a protector 5.

The sliding seat 2 mainly includes a seat cushion 21, a seatback 22 and a head rest 23. The sliding seat 2 is configured to be slidable in an arrowed Z direction by an upper rail 4 attached to a lower face of the seat cushion 21 and a rail 3 disposed below the seat cushion 21 and to which the upper rail 4 is slidably attached.

Figure 4:
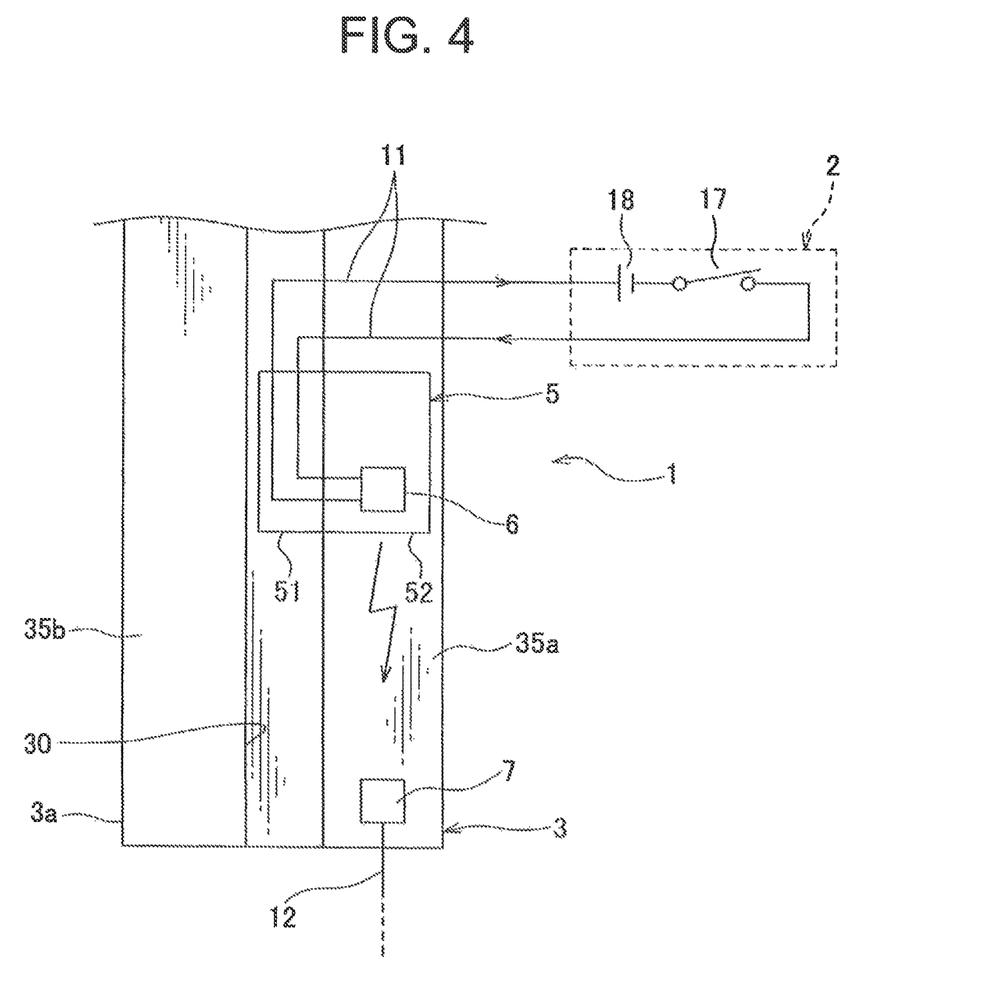
FIG. 4 is a schematic configuration diagram of the signal transmitter-receiver apparatus shown in FIG. 2.

Furthermore, in this embodiment, as shown in FIG. 4, the sliding seat 2 is mounted with a seating sensor 17 as the above-mentioned "electronic device" configured to detect whether or not a passenger is seated and a battery 18 configured to supply power to the seating sensor 17. This battery 18 has a life of one to three years and can be replaced at the timing of car maintenance and such. In FIG. 4, the upper rail 4 is omitted.

Figure 2:
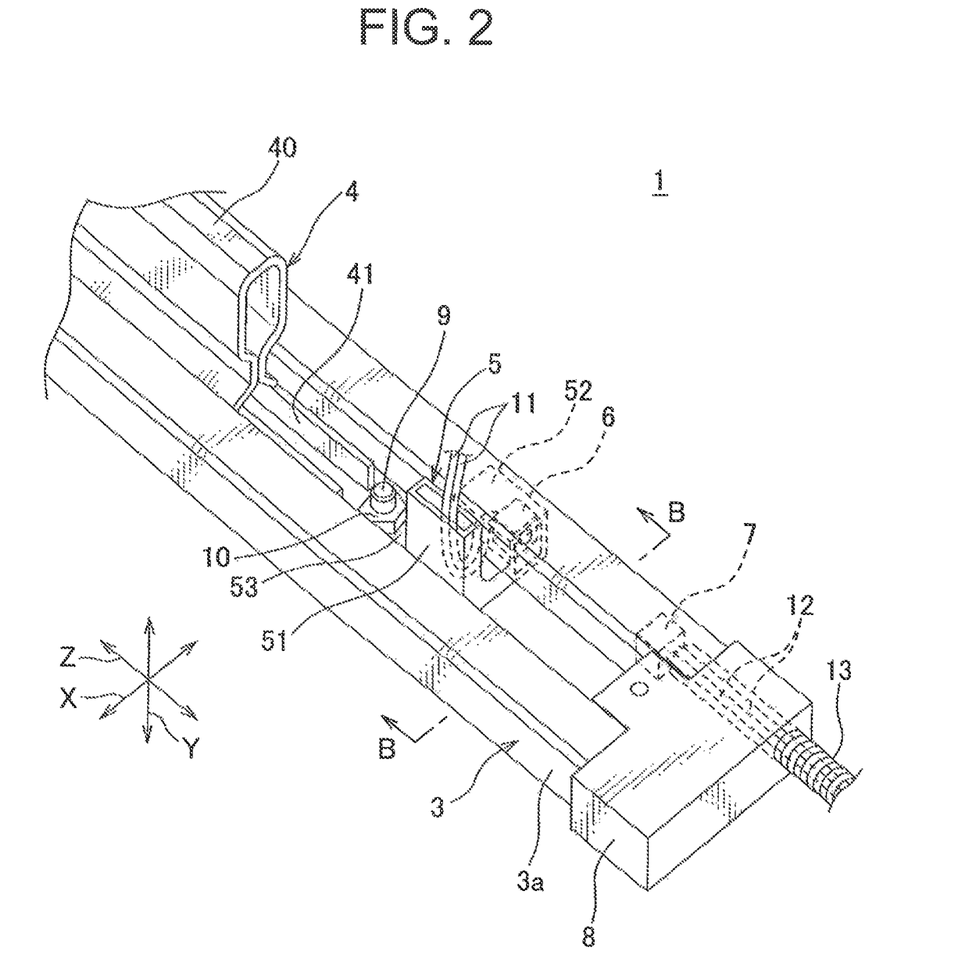
FIG. 2 is an enlargement view of a portion of FIG. 1 indicated by "A"
Figure 3:
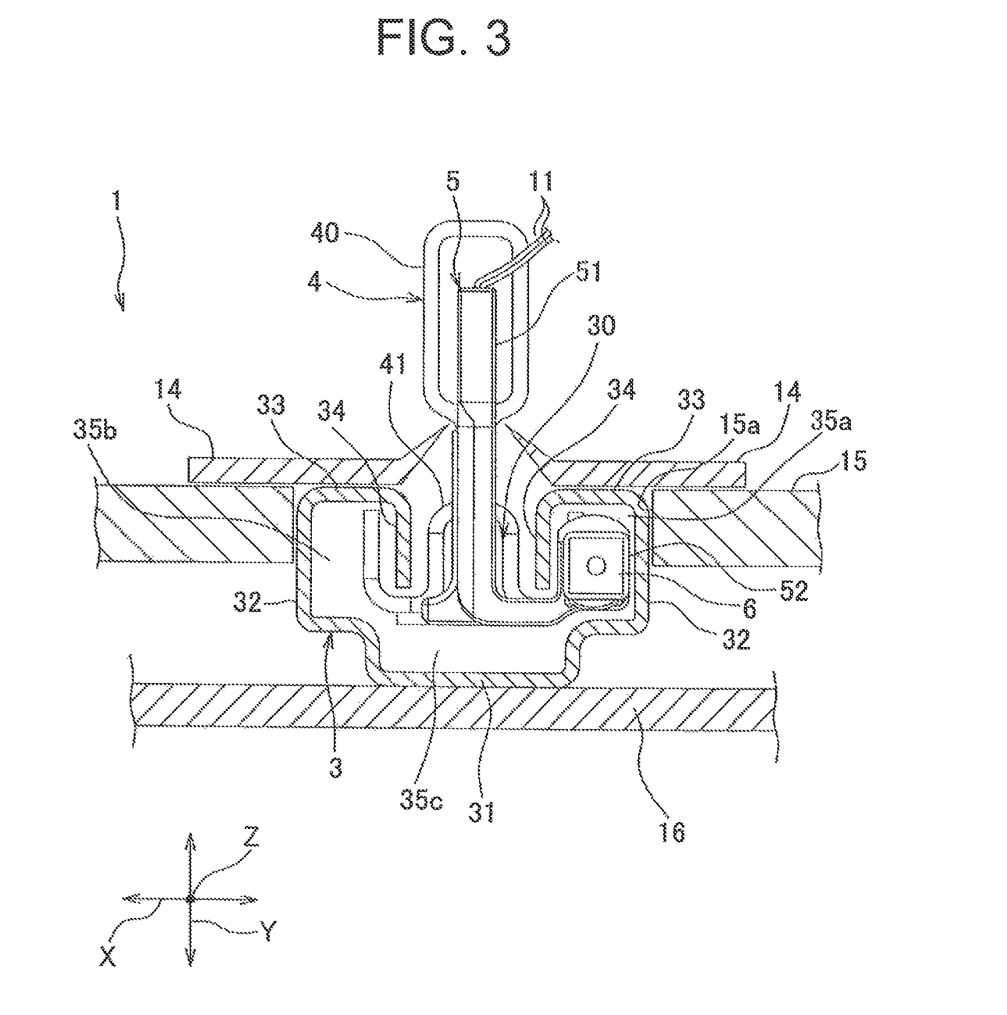
FIG. 3 is a cross-sectional view taken along a line B-B in FIG. 2.

An arrow Z shown in FIGS. 1 through 3 is indicative of a longitudinal direction of the rail 3. An arrow X is indicative of a width direction of the rail 3. An arrow Y is indicative of a height direction of the rail 3.

The upper rail 4 is obtained by, for example, roll forming, pressing and/or welding a metal plate. The upper rail 4 includes a seat mount portion 40 located outside of the rail 3 and to which the sliding seat 2 is mounted, and a sliding portion 41 located inside of the rail 3.

The rail 3 is made of a metal plate formed into a long tube-like shape and includes a slit 30 formed at an upper face of the rail 3. As shown in FIG. 3, this rail 3 includes a bottom wall 31 disposed on a floor panel 16 of the automobile, a pair of side walls 32, a pair of upper walls 33 extending toward each other from upper ends of the respective side walls 32, and a pair of inner walls 34 extending toward the bottom wall 31 from respective end portions of the respective upper walls 33 located distant from the side wall 32. Furthermore, the rail 3 is formed such that a cross-sectional shape of the rail 3 is equivalent across from one end portion 3a to another end portion 3h in the longitudinal direction. The above-mentioned slit 30 is a space between the pair of inner walls 34. Furthermore, spaces 35a, 35b are formed on both sides of the slit 30 in the arrowed X direction, and a space 35c communicated with the spaces 35a, 35b is formed below the slit 30.

An opening portion at the one end portion 3a of the rail 3 is closed with a cap 8 (refer to FIG. 2). Furthermore, a pair of moldings 14 is attached to the pair of upper walls 33 of the rail 3 (refer to FIG. 3). This pair of moldings 14 covers the slit 30 to prevent a foreign object from entering in the rail 3. Furthermore, the rail 3 is disposed between the floor panel 16 and a mat 15 (refer to FIG. 3). The above-described seat mount portion 40 and a later-described protector 5 are passed through a slit 15a of the mat 15 and located above the mat 15, i.e. located on the sliding seat 2 side.

The above-mentioned first electric wire 11 is a well-known covered electric wire, and in this embodiment, there are provided two first electric wires 11. One ends of these first electric wires 11 are connected to a circuit (i.e. a portion surrounded by a dotted line in FIG. 4) including the seating sensor 17 and the battery 18, and another ends of the first electric wires 11 are connected to the signal transmitter 6. When the seating sensor 17 detects that a passenger is seated, a signal is transmitted from the signal transmitter 6.

The above-mentioned second electric wire 12 is a well-known covered electric wire, and there are provided two second electric wires 12. One ends of these second electric wires 12 are connected to an ECU (Electronic Control Unit) as the above-mentioned "electronic device" provided at the vehicle body side, and another ends of the second electric wires 12 are connected to the signal receiver 7. When the signal indicative of the seating of the passenger is transmitted from the signal transmitter 6, the signal receiver 7 receives this signal and transmits to the ECU. In addition, these second electric wires 12 are passed through a corrugated tube 13 and protected.

In this embodiment, the signal transmitter 6 includes a light emitting diode. Thus, the signal transmitter 6 emits light when the seating sensor 17 detects the seating of the passenger. Furthermore, in this embodiment, the signal receiver 7 includes a photodiode. Thus, when the signal transmitter 6 emits light, the signal receiver 7 detects this light and transmits to the ECU that the seating sensor 17 has detected the seating of the passenger.

The term "wireless transmission" used in the present invention means that a signal is transmitted without using an electric wire, and the term "signal" may include, aside from the above-mentioned light, acoustic wave and electric wave.

The protector 5 is made of synthetic resin. As shown in FIGS. 2 and 3, the protector 5 includes a tube portion 51 through which the first electric wire 11 is passed, a holding portion 52 holding the signal transmitter 6, and a bracket portion 53 configured to be attached to the upper rail 4. The holding portion 52 is slidably housed in the space 35a of the rail 3. The tube portion 51 is extending from the holding portion 52 in a L-shaped tube-like fashion and is passed through the space 35c and the slit 30 and lead out to the outside of the rail 3 from inside. The bracket portion 53 is attached to one end of the sliding portion 41 by a bolt 9 and a nut 10. By sliding the upper rail 4, the protector 5 attached to the one end of the sliding portion 41 slides in conjunction with the upper rail 4 and the sliding seat 2.

The signal transmitter 6 is held by the holding portion 52 of the protector 5 as described above and disposed in the rail 3, i.e. in the space 35a. Furthermore, as shown in FIG. 2, the signal receiver 7 is drawn into the rail 3, i.e. into the space 35a, through the opening portion at the one end portion 3a of the rail 3 and fixed to the one end portion 3a. In such a manner as described above, in the present invention, the signal transmitter 6 and the signal receiver 7 are disposed in the rail 3. Also, the signal transmitter 6 and the signal receiver 7 are arranged opposed to each other in a straight line. Furthermore, a gap between the signal transmitter 6 and the signal receiver 7 is changed by sliding the sliding seat 2 in the arrowed Z direction.

According to the signal transmitter-receiver apparatus 1 described above, the signal transmitter 6 moves in conjunction with the sliding seat 2, and the signal is wirelessly communicated between the signal transmitter 6 and the signal receiver 7. Thus, there is no need to provide an extra length to the first electric wire 11 for a sliding distance of the sliding seat 2, thereby simplifying the structure of the entire apparatus.

Furthermore, according to the signal transmitter-receiver apparatus 1, the signal transmitter 6 and the signal receiver 7 are arranged opposed to each other in a straight line in the rail 3. Thus, a foreign object will not exist between the signal transmitter 6 and the signal receiver 7, and thus the signal, i.e. light, wirelessly transmitted from the signal transmitter 6 can be reliably detected by the signal receiver 7. In other words, the reduction in the receiving sensitivity of the wirelessly transmitted signal can be prevented using the rail 3, the existing component.

In addition, when using electric wave for the wireless communication between the signal transmitter 6 and the signal receiver 7, the electromagnetic shield effect by the rail 3 can be achieved as well, thereby further preventing the reduction in the receiving sensitivity of the wirelessly transmitted signal, i.e. the electric wave, and reducing the radiation noise as well.

Moreover, since the signal transmitter-receiver apparatus 1 includes the protector 5, the signal transmitter 6 can be easily fixed to the upper rail 4. In addition, the first electric wire 11 can be prevented from being damaged by hitting against an edge of the rail 3.

Second Embodiment

Figure 5:
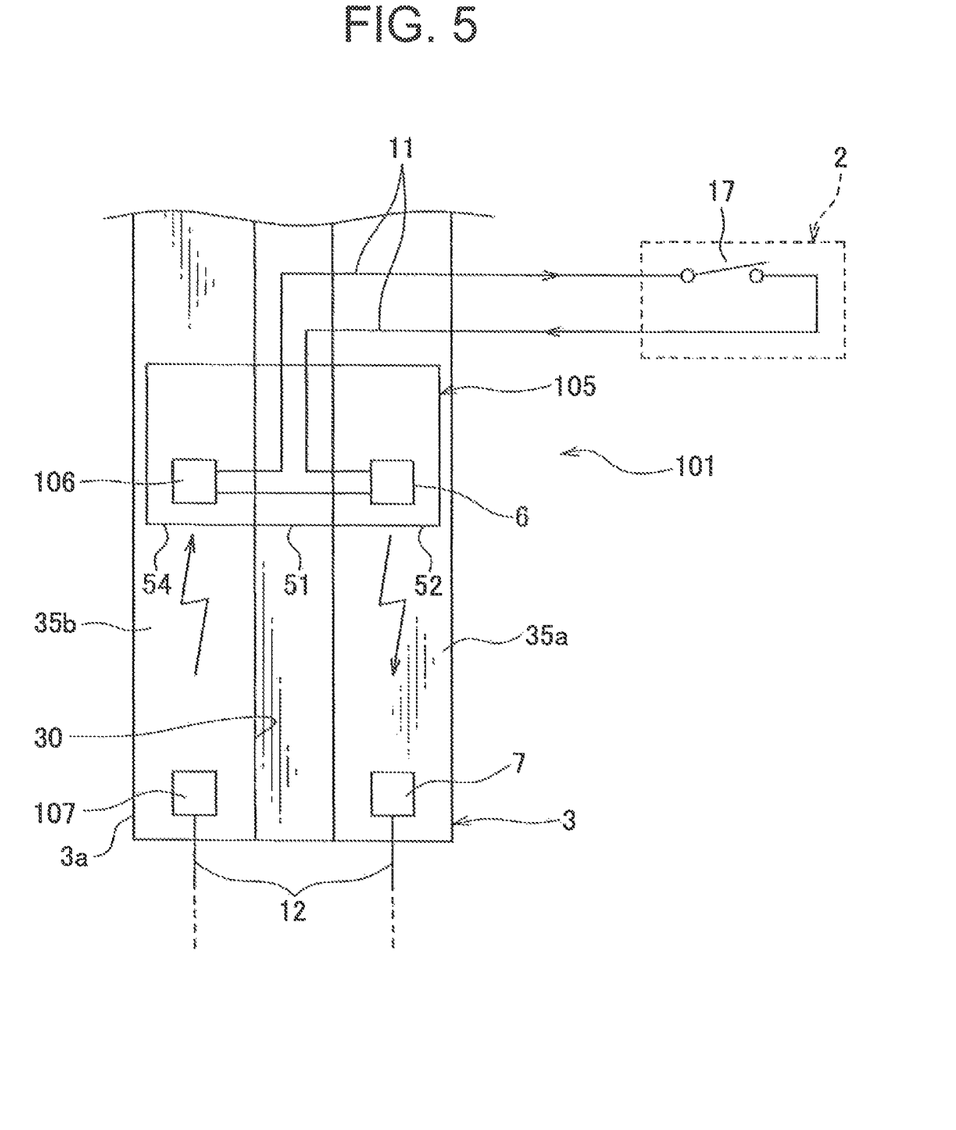
FIG. 5 is a schematic configuration diagram of a signal transmitter receiver apparatus according to a second embodiment of the present invention.

A signal transmitter-receiver apparatus according to a second embodiment of the present invention will be explained with reference to FIG. 5. In FIG. 5, elements identical to those of the first embodiment are denoted by the same reference signs to omit explanation.

Like the first embodiment, "signal transmitter-receiver apparatus 101" of the present invention shown in FIG. 5 is an apparatus configured to connect, using wireless communication, the seating sensor 17 as "electronic device" provided at the vehicle sliding seat 2 to the ECU as "electronic device" provided at the vehicle body side. In FIG. 5, the upper rail 4 is omitted. In this embodiment, the rail 3 and the upper rail 4 are identical to those of the first embodiment, this the explanation thereof is omitted.

The signal transmitter-receiver apparatus 101 includes a first electric wire 11 having one end connected to the seating sensor 17 provided at the sliding seat 2, a second electric wire 12 wired at the vehicle body side, a signal transmitter 6 connected to another end of the first electric wire 11, a signal receiver 7 connected to an end of the second electric wire 12 and configured to receive a signal wirelessly transmitted from the signal transmitter 6, a photovoltaic element 106 connected to another end of the first electric wire 11, a light emitting element 107 connected to an end of the second electric wire 12, and a protector 105.

Like the first embodiment, the signal transmitter 6 includes a light emitting diode and is disposed in the space 35a of the rail 3.

Like the first embodiment, the signal receiver 7 includes a photodiode and is drawn into the space 35a of the rail 3 through the opening portion at the one end portion 3a of the rail 3 and fixed to the one end portion 3a. Furthermore, the signal transmitter 6 and the signal receiver 7 are arranged opposed to each other in a straight line.

The above-mentioned photovoltaic element 106 includes a solar battery and is disposed in the space 35b of the rail 3.

The light emitting element 107 includes a high-powered light emitting diode and is drawn into the space 35b of the rail 3 through the opening portion at the one end portion 3a of the rail 3 and fixed to the one end portion 3a. Furthermore, the photovoltaic element 106 and the light emitting element 107 are arranged opposed to each other in a straight line.

The protector 105 is made of synthetic resin and includes the tube portion 51 through which the first electric wire 11 is passed, the holding portion 52 holding the signal transmitter 6 and slidably housed in the space 35a of the rail 3, a second holding portion 54 holding the photovoltaic element 106 and slidably housed in the space 35b of the rail 3, and the bracket portion 53 (not shown in FIG. 5, but has the same configuration as shown in FIG. 2) configured to be attached to the upper rail 4.

For the signal transmitter-receiver apparatus 101 described above, electromotive force is induced at the photovoltaic element 106 by the light radiated from the light emitting element 107 toward the photovoltaic element 106, and the signal transmitter 6 emits light by this electromotive force. Thus, there is no need to provide the above-described battery 18 (refer to FIG. 4) to the sliding seat 2.

Third Embodiment

Figure 6:
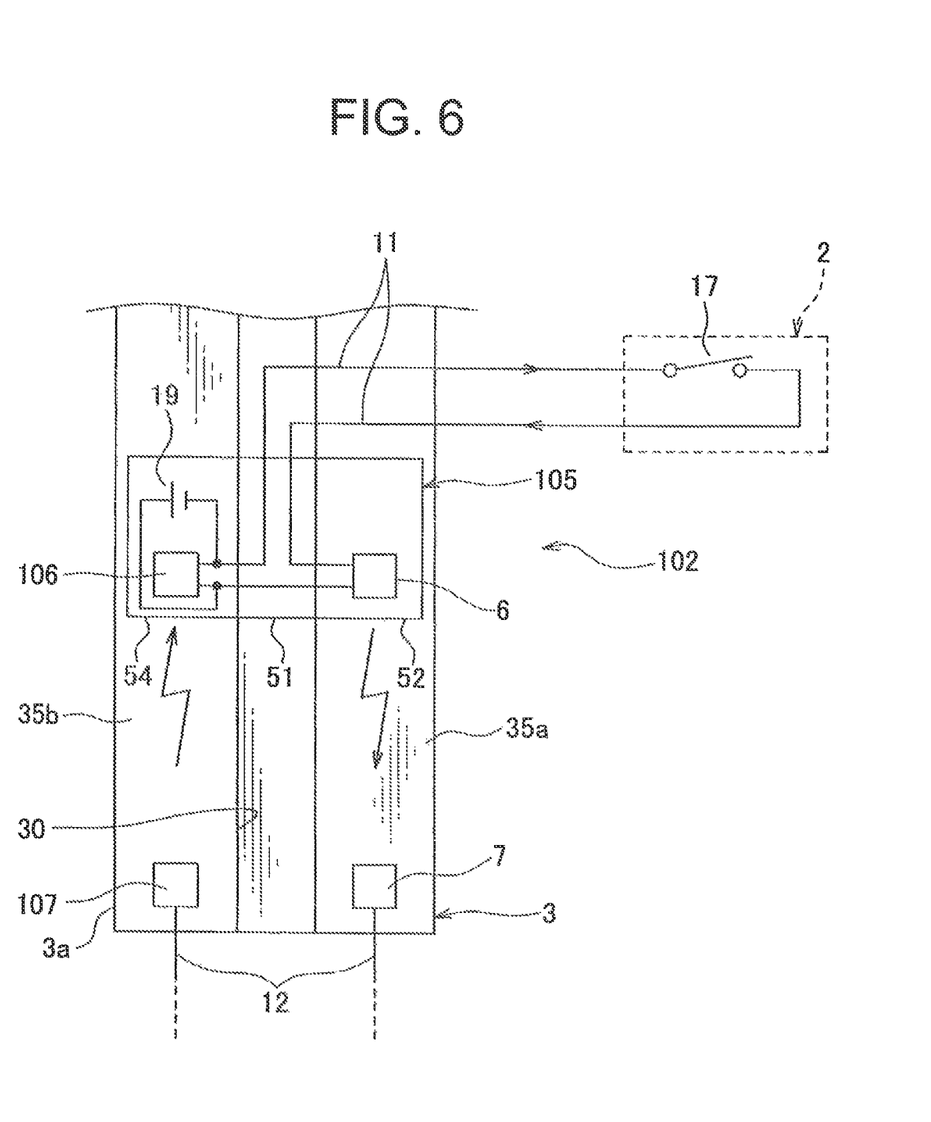
FIG. 6 is a schematic configuration diagram of a signal transmitter-receiver apparatus according to a third embodiment of the present invention.

A signal transmitter-receiver apparatus according to a third embodiment of the present invention will be explained with reference to FIG. 6. In FIG. 6, elements identical to those of the first, and second embodiments are denoted by the same reference signs to omit explanation.

In "signal transmitter-receiver apparatus 102" of the present invention shown in FIG. 6, a battery 19 having a charging function is added to the signal transmitter-receiver apparatus 101 explained in the second embodiment. This battery 19 is connected to the photovoltaic element 106 and to the signal transmitter 6 and is held by the second holding portion 54 of the protector 105. Thus, the battery 19 is charged by the electromotive force of the photovoltaic element 106.

For the signal transmitter-receiver apparatus 102 described above, the signal transmitter 6 emits light, by the battery 19 or by the electromotive force of the photovoltaic element 106. Thus, since the battery 19 has the charging function and is charged by the electromotive force of the photovoltaic element 106, there is no need to replace the battery 19.

In the first through third embodiments described above, the signal transmitter 6, the photovoltaic element 106 and the battery 19 having the charging function are fixed to the upper rail 4 via the protector 5, 105; however, in the present invention, these may be fixed directly to the upper rail 4. Furthermore, in the present invention, the battery 19 having the charging function may be attached to the sliding seat 2.

Furthermore, the first through third embodiments described above illustrate the examples of providing two first electric wires 11; however, "signal transmitter" of the present invention may be multichannel-adaptive, thus two or more first electric wires 11 may be provided. In other words, in the above-described first through third embodiments, the two first electric wires 11 are provided because one seating sensor 17 is provide for one sliding seat 2; however, when connecting the ECU to a buckle switch of a seatbelt, not just to the seating sensor 17, and/or when connecting these electronic devices to ground, and/or when two seating sensors 17 are provided for one sliding seat (e.g. in the case of a sliding seat on which two passengers can sit), a plurality of first electric wires 11 may be provided according to the number of these electronic devices. In addition, in the present invention, the number of the second electric wires 12 is also arbitral.

Moreover, in addition to the configuration of the signal transmitter receiver apparatus explained in the first through third embodiments, the signal transmitter-receiver apparatus of the present invention may further include "second signal transmitter" connected to the end of the second electric wire, "second signal receiver" connected to the another end of the first electric wire and configured to receive the signal wirelessly transmitted from the second signal transmitter, and "control device" connected to the signal transmitter 6 and the second signal receiver. The second signal transmitter may be disposed adjacent to the signal receiver 7, or may be disposed at a location distant from the signal receiver 7 (e.g. the location where the light emitting element 107 described in the second and third embodiments is positioned), or may be disposed adjacent to the light emitting element 107. Depending on the location of the second signal transmitter, the second signal receiver may be disposed adjacent to the signal transmitter 6, or may be disposed at a location distant from the signal transmitter 6 (e.g. the location where the photovoltaic element 106 described in the second and third embodiments is positioned), or may be disposed adjacent to the photovoltaic element 106. For example, a signal for transmitting ON/OFF of an accessory power of the vehicle is transmitted and received between the second signal transmitter and the second signal receiver. In this case, when the accessory power is turned ON, the signal indicative of this is transmitted from the second signal transmitter to the control device via the second signal receiver, and the instructions of the control device initiates the operation of the electronic device (i.e. the seating sensor 17). Thus, the signal transmitter-receiver apparatus of the present invention is capable of performing not only the signal transmission from the vehicle sliding seat side to the vehicle body side, but the signal transmission from the vehicle body side to the vehicle sliding seat side.

The embodiments described above are only representative embodiments of the present invention, and the present invention is not limited to these embodiments. That is, the present invention can be changed and performed in various ways without departing from the gist of the present invention.

REFERENCE SIGNS LIST 1, 101, 102 signal transmitter-receiver apparatus
2 vehicle sliding seat
3 rail
4 upper rail
5, 105 protector
6 signal transmitter
7 signal receiver
11 first electric wire
12 second electric wire

The invention claimed is:
1. A signal transmitter-receiver apparatus, comprising:
a first electric wire having one end connected to an electronic device provided at a vehicle sliding seat;
a second electric wire wired at a vehicle body side;
a signal transmitter connected to another end of the first electric wire;
a signal receiver connected to an end of the second electric wire and configured to receive a signal wirelessly transmitted from the signal transmitter;
wherein the signal transmitter and the signal receiver are disposed in a rail disposed below the sliding seat,
wherein the signal transmitter is fixed to an upper rail directly or via another member, the upper rail being attached to a lower face of the sliding seat and being slidably attached to the rail,
wherein the signal receiver is fixed to one end portion of the rail, and
wherein the signal transmitter and the signal receiver are arranged opposed to each other in a straight line.

2. The signal transmitter-receiver apparatus according to claim 1, further comprising a protector made of synthetic resin, wherein the protector includes:
- a tube portion through which the first electric wire is passed;
- a holding portion holding the signal transmitter; and
- a bracket configured to be attached to the upper rail.

3. The signal transmitter-receiver apparatus according to claim 2, further comprising:
- a photovoltaic element connected to another end of the first electric wire; and
- a light emitting element connected to an end of the second electric wire and configured to radiate light to the photovoltaic element.

4. The signal transmitter-receiver apparatus according to claim 3, wherein the signal transmitter is activated by a battery having charge function or by electromotive force of the photovoltaic element, and wherein the battery is charged by electromotive force of the photovoltaic element.

5. The signal transmitter-receiver apparatus according to claim 1, further comprising:
- a photovoltaic element connected to another end of the first electric wire; and
- a light emitting element connected to an end of the second electric wire and configured to radiate light to the photovoltaic element.

6. The signal transmitter-receiver apparatus according to claim 5, wherein the signal transmitter is activated by a battery having charge function or by electromotive force of the photovoltaic element, and wherein the battery is charged by electromotive force of the photovoltaic element.

* * * * *